United States Patent

Wetzel

[15] 3,675,793
[45] July 11, 1972

[54] SOD GATHERING APPARATUS

[72] Inventor: Clifford C. Wetzel, Ithaca, Mich. 48847

[22] Filed: Nov. 24, 1969

[21] Appl. No.: 879,266

[52] U.S. Cl. .............................. 214/6 B, 172/20, 214/6 DK
[51] Int. Cl. ....................................................... B65g 57/32
[58] Field of Search .................. 214/6 B, 6 K, 6 H, 6; 172/19, 172/20

[56] References Cited

UNITED STATES PATENTS

| | | | |
|---|---|---|---|
| 3,446,103 | 5/1969 | Foster | 271/76 X |
| 3,547,266 | 12/1970 | Michel | 214/6 G |
| 2,686,603 | 8/1954 | Lawson | 214/6 H |
| 3,122,241 | 2/1964 | Lawson, Sr. | 214/6 DK |
| 3,446,368 | 5/1969 | Nelson | 214/6 DK |
| 3,501,025 | 3/1970 | Jay et al. | 214/6 B |
| 3,519,082 | 7/1970 | Miner | 172/20 X |
| 3,523,616 | 8/1970 | Neely, Jr. | 214/6 B |
| 3,531,001 | 9/1970 | Lunden | 214/6 DK |

FOREIGN PATENTS OR APPLICATIONS 1,005,370  9/1965  Great Britain......................214/6 DK

*Primary Examiner*—Robert J. Spar
*Attorney*—Learman & McCulloch

[57] ABSTRACT

Apparatus and methods for gathering sod cut in strips and lying in a field wherein each strip successively is lifted from one end, transported vertically to a substantially horizontal transfer station, delivered to a platform, and deposited one atop another in a stack. The platform is lowered in timed relation to the depositing of each successive strip so as to maintain the upper end of the stack at a substantially constant level.

9 Claims, 3 Drawing Figures

INVENTOR.
CLIFFORD C. WETZEL
BY
*Learman & McCulloch*

INVENTOR.
CLIFFORD C. WETZEL
BY
Learman & McCulloch

SOD GATHERING APPARATUS

The invention disclosed herein relates to methods and apparatus for gathering sod cut in strips from a field of growing grass, and more particularly to apparatus and methods for gathering the strips of sod in a stack composed of successive layers of sod strips.

Conventional sod cutting and sod gathering machinery includes mechanism for cutting strips of sod from grass growing in a field, lifting the sod strips and either winding the cut strips into rolls or leaving the cut strips on the ground for subsequent rolling manually. In either event, personnel is required to effect either the rolling of the sod or the handling of the rolled sod. In addition, the rolled sod is either deposited on the ground for subsequent collection or is conveyed to a truck or the like which travels a course parallel to that of the sod cutting machine. Again, personnel in addition to those engaged in the operation of the sod cutting machine is required to handle the sod.

Although winding of sod strips into rolls is the common practice of handling sod strips, there are several objections to rolled sod. For example, the outside or trailing end of a roll of sod has a tendency to unwind and lie tangentially of the roll. If the end is permitted to unwind, it quite easily may be damaged. Consequently, care and time must be taken in arranging the rolls of sod in such manner that their free ends do not unwind. Another disadvantage of rolled sod is that the inner or leading end of the rolled sod is subjected to considerable stress in the rolling process. When the strip is unrolled for placement, the inner end of the strip is likely to be torn at the zone of stress concentration, thereby causing problems in the knitting of the sod to the sub-soil and to the adjacent ends of other strips. Moreover, rolled sod has a tendency to remain curled after unrolling and laying, thereby resulting in the possibility that the ends of a sod strip will not knit to the sub-soil.

An object of this invention is to provide methods and apparatus for gathering sod without rolling of the sod strips, thereby overcoming the problems associated with rolled sod.

Another object of the invention iS to provide apparatus and methods for gathering strips of sod in stacked form without the necessity of rolling the strips.

A further object of the invention is to provide improved methods and apparatus of gathering sod with substantially fewer workmen than previously have been required.

Other objects and advantages of the invention will be pointed out specifically or will become apparent from the following description when it is considered in conjunction with the appended claims and the accompanying drawings, in which:

Figure 1:
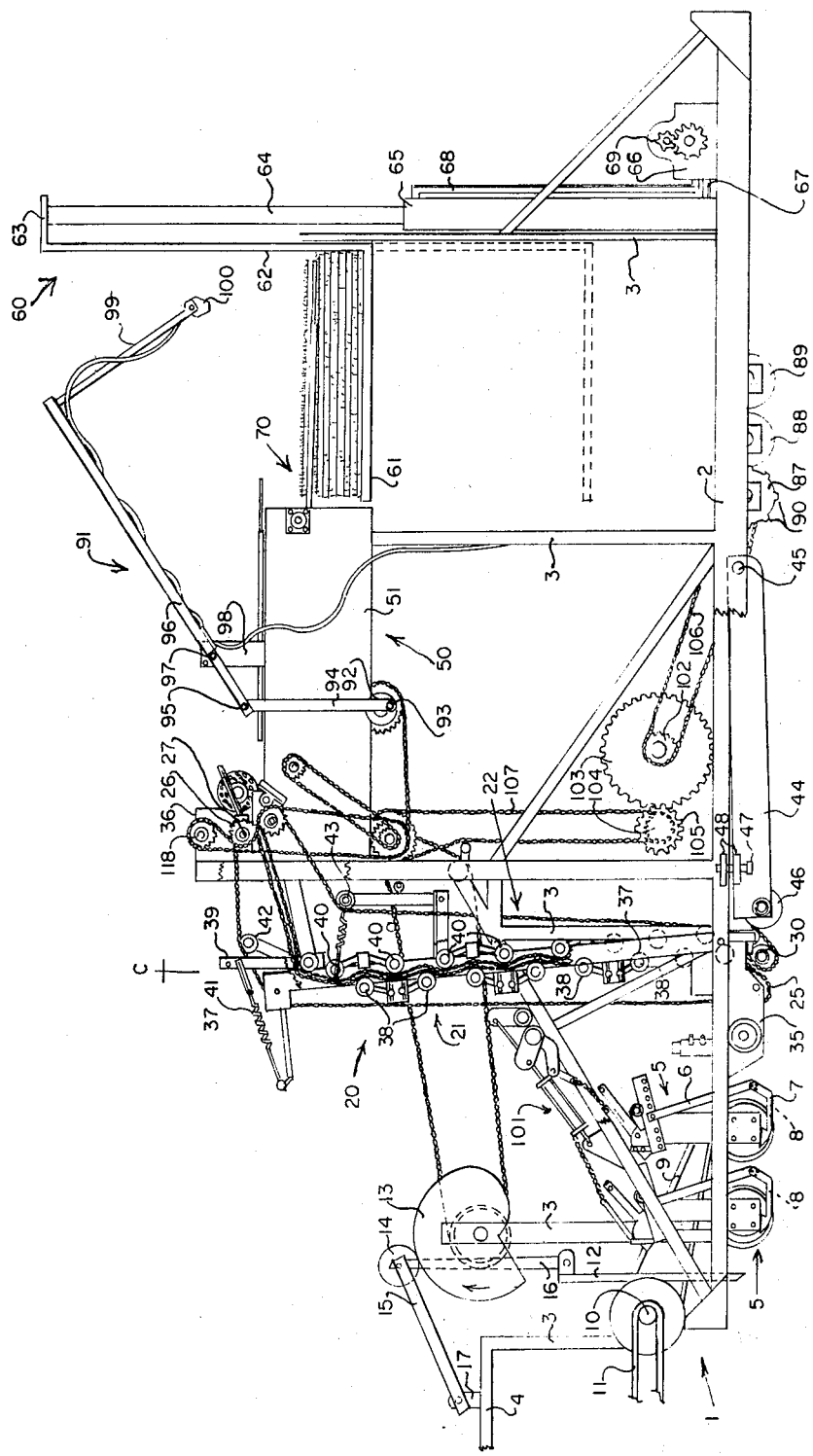
FIG. 1 is a fragmentary, side elevational view of apparatus constructed in accordance with the invention.

Apparatus constructed in accordance with the invention comprises a frame 1 having spaced apart, longitudinally extending members 2 and upstanding members 3 forming a rigid skeleton. At the forward end of the frame 1 is a horizontal member 4 on which may be secured a hitch (not shown) for coupling the frame 1 to a tractor (not shown) or other towing vehicle. At the forward end of the frame is mounted a pair of sod cutting units 5, the units 5 being of conventional construction and arranged side-by-side but in longitudinally staggered relation. Each unit 5 comprises a pair of spaced apart arms 6 joined at their lower ends to side cutting knives 7, the knives being joined by a horizontal knife 8, as is conventional. The arms 6, together with their knives 7 and 8, are oscillated fore and aft by a driving mechanism (not shown) which is driven from a belt 9 trained around a pulley that is mounted on a shaft 10 which, in turn, is driven by a belt 11 from the power take-off unit of the towing vehicle. Also mounted on the forward end of the frame 1 is a transverse, vertically movable knife 12 that periodically moves downwardly to cut the sod transversely to the direction of movement of the frame 1. The vertical movements of the knife 12 are controlled by a cam 13 rotatably mounted on a frame member 3 and against which rides a cam-follower 14 journaled on an arm 15. A knife carrier 16 also is connected to the arm 15 and the latter is pivoted on an ear 17 for oscillations in accordance with the contour of the cam 13.

The sod cutting units 5 and 12 form no part of the invention per se and may be selected from any one of a number of commercially available units. It is convenient, however, to mount the sod cutting units on the frame 1 so as to enable sod to be cut and gathered in a continuous operation.

Sod pick-up and elevating mechanism 20 is mounted on the frame 1 rearwardly of the sod cutting units 5 and comprises a pair of endless webs or conveyors 21 and 22, each of which is composed of parallel, spaced apart rods or bars 23 and 24, respectively, joined to one another at corresponding ends. The web 21 at its lower end is trained around a toothed turning drum 25 which functions as a sprocket wheel and at its upper end is trained around toothed driving wheels 26 mounted on a shaft 27. The web 21, therefore, has a forward run 28 and a rearward run 29. The web 22 at its lower end is trained around a toothed turning drum 30 and at its upper end is trained around toothed driving wheels 31 mounted on a shaft 32. The web 22, therefore, has a forward run 33 and a rearward run 34. The rearward run 29 of the web 21 confronts and substantially parallels the forward run 33 of the web 22. The turning drum 25 is journaled in flanges 35 carried by the machine frame 1 and the shaft 27 on which the driving wheels 26 are mounted is journaled in supports 36 carried by frame members 3.

Pivoted on the horizontal frame members 2 is a pair of upstanding arms 37 on which is mounted a plurality of spring pressed roller bars 38 which bear against the forward surface of the rear run 29 of the web 21. Fixed on the frame members 2 is a pair of upstanding arms 39 on which is mounted a plurality of spring pressed roller bars 40 which bear against the rear surface of the forward run 33 of the web 22. Springs 41 urge the arms 37 toward arms 39, but permit yielding movement of the arms 37 so as to vary the space between the confronting runs 29 and 33 of the respective webs 21 and 22. The spring mounting of the rollers 38 and 40 also provide for adjustment of the spacing between the confronting runs. Spring urged idler rollers 42 and 43 maintain proper tension on the webs 21 and 22, respectively.

The sod pick-up and turning drum 30 is journaled at the forward end of a pair of frame members 44 that are pivoted at their rearward ends as at 45 to the horizontal frame members 2. Immediately rearwardly of the turning drum 30 is a gauge roller 46 journaled in the frame members 44. The arrangement is such that the pick-up drum 30 is at a slightly lower level that that of the drum 25 and the gauge roller 46 is at a slightly lower level than that of the turning drum 30. The significance of this construction will be pointed out hereinafter. Adjusting screw means 47 passes through ears 48 on the members 2 and 44 so as to permit adjustment of the height of the members 30 and 46.

Rearwardly of the sod elevating means 20 is a transfer station 50 comprising a pair of spaced apart, parallel side members 51 supported on frame members 3. Spanning the distance between the side members 51 is a support bar 52 in which is mounted a plurality of rods or tynes 53 which are substantially parallel to, but are spaced from one another. Each tines is bent intermediate its ends as at 54 enough to form a rearwardly extending, substantially horizontal support portion 55. Spanning the side members 51 and occupying the space between the tynes 53 and the driving wheels 31 is a rod 56 which partially bridges the gap between the tynes and the driving wheels. Above the rod 56 is a forwarding shaft 57 journaled in bearings carried by adjustable arms 58 that are mounted on the members 36, the shaft 57 being covered by a soft, rubbery material such as polyurethane or the like.

Rearwardly of the transfer station 50 is a receiving or loading platform 60 having a horizontal supporting member 61 to the rear end of which is fixed an upstanding wall 62 terminating at its upper end in a rearwardly directed flange 63. Secured to the flange 63 is one end of a piston rod 64, the opposite end of which is secured to a piston that is reciprocable in a hydraulic cylinder 65. A reversible hydraulic pump 67 communicates with opposite ends of the cylinder 65 via hydraulic lines 67 and 68, and the pump 66 is driven by a reversible electric motor 69. The platform 60 is adjustable from the position shown in full lines in FIG. 1 to the position shown in dotted lines.

Transfer conveyor means 70 is associated with the transfer station 54 for conveying sod from the transfer station to the platform 60. The conveyor 70 comprises a pair of forward stub shafts 71 and a pair of rearward stub shafts 72 journaled in the side members 51. Mounted on the shafts 71 and 72 are pairs of sprocket wheels 73 and 74 around which are trained sprocket chains 75, each chain having an upper run 76 and a lower run 77. Secured to the chains 75 is a plurality of pairs of mounting members 78, in each of which is fixed a transverse shaft 79. Rotatably journaled on each shaft 79 is a sleeve 80 on which is fixed a plurality of spaced apart retainers 81. Fixed to each retainer 81 is an elongate finger 82 each of which terminates at its rearward end in a reduced size extension 83. In the disclosed embodiment, there are two sets of fingers 82 spaced substantially 180° apart with respect to the orbital path of the chains 75.

Each set of fingers 82 is pivotal relatively to its supporting shaft 79. To maintain the fingers 82 in a substantially horizontal position when either set traverses the upper run 76 of the chains 75, each side member 51 includes a guide rail 84 that is engaged by the adjacent retainer 81 so as to support the associated set of fingers 82 and prevent their pivoting until such time as the retainers reach the rear end of the rails 84.

The spacing between the fingers 82 corresponds substantially to the spacing between the tynes 55, but the tynes and fingers are staggered transversely of the path of movement of the tynes. Moreover, the height at which the tynes 82 are supported by the mounting members 78 and the retainers 81, when the tynes traverse the upper run 76 of the chains 75, is such that the tynes project above the level of the fingers 55.

The apparatus is supported for movement along the ground by the gauge roller 46 and by drums 87, 88 and 89 that are journaled in bearings carried by the frame members 2. The drum 87 is provided with a plurality of teeth 90 which engage the ground and enable the drum 87 to serve as driving and timing means for controlling the operation of all moving parts of the apparatus except the sod cutting units 5. The driving connections between the drum 87 and the parts driven therefrom will be described in the description of the operation of the apparatus.

Actuating means designated generally by the reference character 91 is provided for effecting incremental lowering of the platform 70 in timed relation to the delivery of sod strips $s$ thereto, and comprises a wheel 92 journaled in one of the side members 51 and having pivoted thereto as at 93 one end of a crank 94, the opposite end of which is pivoted as at 95 to one end of an oscillatable arm 96. The arm 96 is pivoted as at 97 between its ends to a support 98 mounted on the side member 51 and carries at its opposite end a probe 99 at the free end of which is a normally open switch contact 100. The rotation of the wheel 92 effects oscillation of the arm 96 about the pivot 97 so as to move the probe 99 from the position shown in FIG. 1 to a position in which the switch 100 lies closely adjacent the upper surface of the platform support member 61.

OPERATION

To condition the apparatus for operation it will be transported to a field in which grass is growing and from which sod is to be cut. The frame 1 is provided with transport wheels (not shown) which may be raised and lowered as desired. The machine should be located at one end of the field and coupled to a towing tractor or the like. The belt 11 should be coupled to the power take-off unit of the towing vehicle to effect back-and-forth oscillation of the sod cutting units 5. The latter may be adjusted to any desired level by hydraulic adjusting means of conventional construction and designated generally by the reference character 101. Prior to imparting movement to the machine, the guide roll 46 will be adjusted so as to ride upon the sub-soil from which sod has been stripped. In adjusting the position of the roll 46, the level of the pick-up roll 30 also will be adjusted so as to be located at a level lower than that of the turning roll 25. The difference in levels between the rolls 25 and 30 should be such that the roll 30 will engage the end of a strip of sod which has been cut by the unit 5.

When the proper adjustments of the cutting units 5 and the roll 30 have been completed, the machine may be drawn through the field so as to enable the units 5 to cut two parallel strips $s$ of sod to a desired depth. As the machine moves forwardly, the driving roll 86 will be rotated. Rotation of the drum 87 is imparted to a train of gears 102, 103, 104 and 105 by means of a chain 106. Rotation of the gear 105 is imparted to the cam 13 via a chain 107, gears 108 and 109, a chain 110 and a gear 111, thereby causing periodic actuation of the blade 12 to cut the sod transversely to form strips the length of which is directly related to the speed of movement of the machine and the size of the cam 13.

The gear 108 is keyed to a shaft 112 on which is fixed four other gears or sprocket wheels, 113, 114, 115 and 116. Trained around the sprocket wheel 115 is a chain 117 which is trained around both driving wheels 26 and 31 and around an idler or turning wheel 118. The turning wheels 26 and 31 are driven in opposite directions so that the confronting runs 29 and 33 of the webs 21 and 22 move upwardly and so that the turning drum 30 rotates clockwise, as viewed in FIGS. 1 and 2. Consequently, the rods or bars 24 of the rear web 22 will lift the end of a cut sod strip off the ground and cause it to be entrained between the confronting web runs 29 and 33 so as to be transported vertically. The bar rollers and the spring 41 will assure retention of the sod strip between the confronting runs as the latter moved upwardly.

Figure 3:
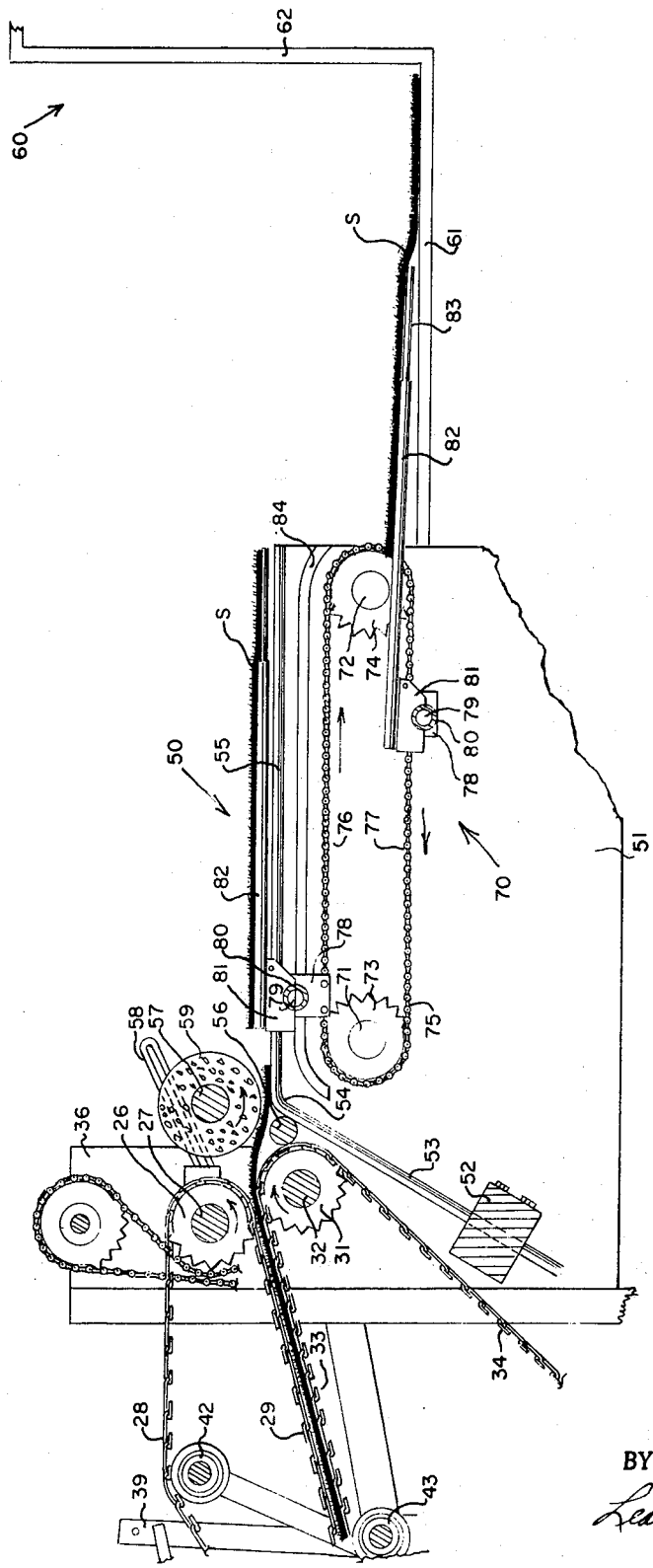
FIG. 3 is an enlarged, longitudinal sectional view of a portion of the apparatus.

As the sod strip traverses the confronting web runs 29 and 33 it is deflected rearwardly so as to assume a substantially horizontal position as it emerges from between the confronting web runs. See FIG. 3. As the sod strip emerges from between the confronting runs, it passes over the bar 56 and under the soft roll 59 which is driven from the shaft 27 by means of a sprocket wheel 120 around which is trained a chain 121, the chain also passing around a sprocket wheel 122 that is fixed to the shaft 27. The roll 59 thus assists the webs 21 and 22 in forwarding the sod strip onto the tynes 55 at the transfer station 50.

The transfer conveyor 70 is driven by chains 123 and 123a that are trained around the sprocket wheel 113 and around a sprocket wheel 124, respectively, that are fixed to the shafts 71. The groups of fingers 82, therefore, move in an orbital path and the number of finger units, their spacing along the chains 75, and the rate of movement of the finger units are so selected that one of the finger units will move from the lower run 77 of the chains 75 to the upper run 76 at about the time that the trailing end of a strip S of sod has passed the forwarding roll 59. As a finger unit 82 moves from the lower run to the upper run, the individual fingers 82 will move above the level of the tynes 55, thereby lifting the sod supported on the tynes and conveying the sod strip rearwardly.

As the finger unit 82 on which a sod strip is supported reaches the rear end of the rails 84, the fingers 82 will overlie the platform support 61. Further movement of the finger unit 82 will cause the latter to move downwardly to the level of the support 61. The sod will sag somewhat between the tynes 82 thereby permitting the sod to engage the upper surface of the member 61. As the finger unit passes from the upper run of the chains to the lower run 77, the fingers 82 will be withdrawn from beneath the sod strip, thereby enabling the latter to lie flat upon the support 61.

Figure 2:
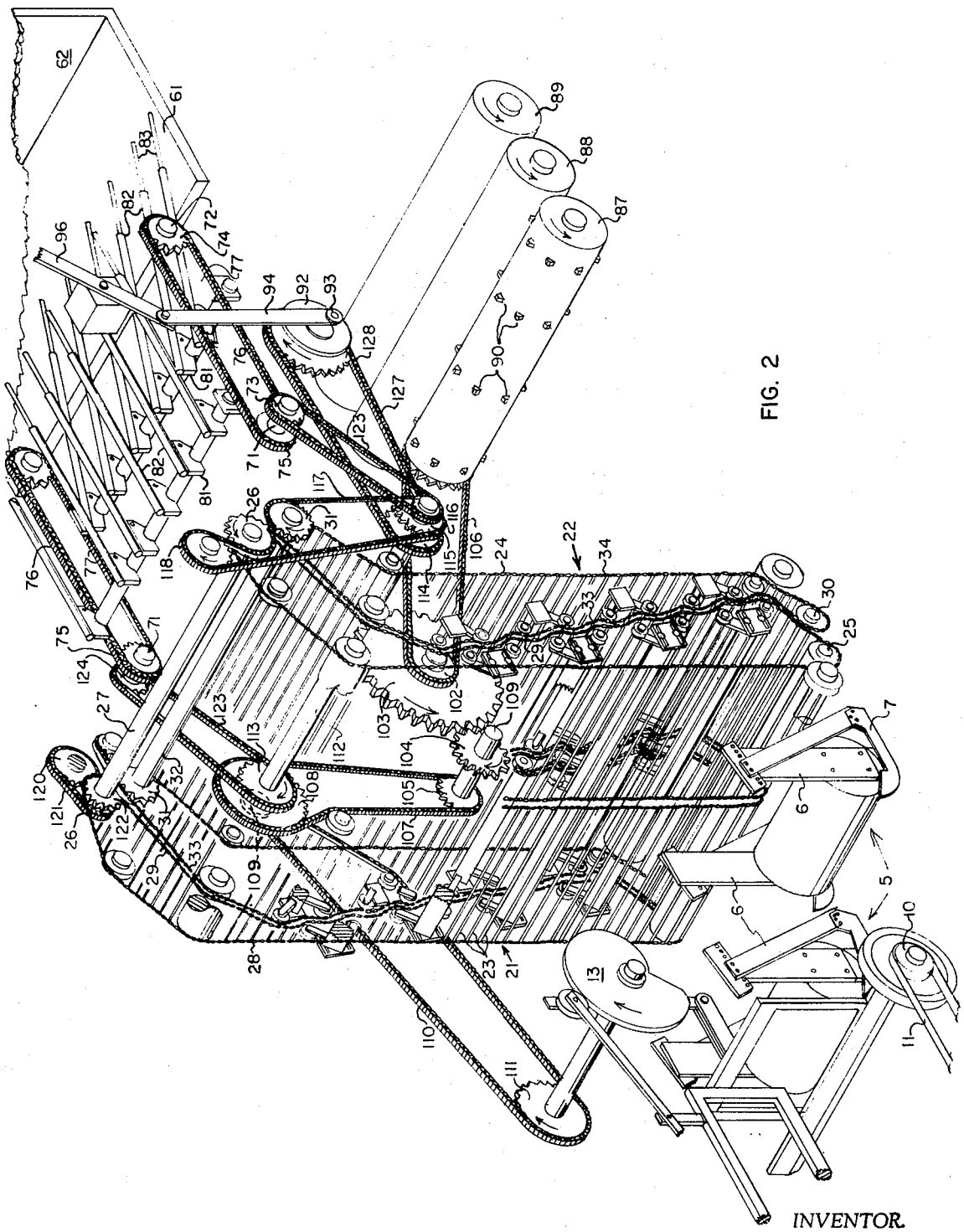
FIG. 2 is a diagrammatic, isometric view of the operating mechanisms, the machine frame being omitted.

As each finger unit 82 traverses the upper run 76 of the chains 75 and moves to the lower run, a chain 127 trained around the sprocket wheels 114 and around a sprocket wheel 128 to which the crank 94 is connected will drive the crank in such direction as to cause the arm 96 to rock clockwise, as viewed in FIG. 1, so as to move the switch 100 into engagement with the upper surface of the sod strip which has been deposited on the support 61 or on a pallet (not shown) supported on the support 61. Since the upper surface of the strip of sod is at a level higher than that of the upper surface of the support 61 (or of the pallet), the switch 100 will be closed, thereby energizing the motor 69 to drive the pump 66 in a direction to cause the platform 60 to be lowered. When the platform has been lowered a distance sufficient to enable the switch 100 to open, operation of the motor ceases. Continued rotation of the sprocket wheel 128 via the chain 127 will restore the arm 96 to its elevated position in readiness for another cycle of operation.

As the machine continues to be drawn through the field from which sod strips have been cut, the successive strips of sod will be lifted from the ground, elevated by the mechanism 21, delivered to the transfer station 50, removed from the transfer station by the finger units 82, and deposited one atop another on the platform 60 so as to form a stack of sod strips. As each successive strip of sod is deposited on the platform, the latter is adjusted downwardly so as to maintain the upper end of the stack at a substantially uniform level.

When a stack of the desired height has been formed the stack may be removed, whereupon a reversing switch (not shown) may be closed so as to drive the motor 69 and the pump 66 in such directions as to elevate the platform 60 to its initial position. The operation then may be continued.

In the disclosure of the driving mechanism for the moving parts of the apparatus, some of the sprocket wheels and the like are not drawn to the scale necessary to achieve proper timing of all parts of the apparatus. The purpose of this is to illustrate with more clarity the parts of the driving mechanism.

This disclosure is intended to be illustrative of presently preferred methods and apparatus. The invention is defined in the claims.

I claim:

1. Apparatus for gathering and stacking strips of sod lying in a field, said apparatus comprising a mobile frame movable along said field; receiving means carried by said frame; means carried by said frame for lifting said strips one after another from the field; continuously operable conveyor means supported by said frame for conveying said strips in sequence toward said receiving means; transfer means; means mounting said transfer means on said frame for movement in an orbital path having a first run in which it lifts each successive strip from said conveyor means and moves said strip to a position overlying said receiving means, said orbital path having a lower, return run; means for driving said transfer means continuously along said path; and guide means acting on said transfer means when the latter is in receiver-overlying position to tilt said transfer means whereby the strip supported thereby may slide off said transfer means onto said receiving means.

2. The apparatus set forth in claim 1 wherein said receiving means includes a vertically movable platform and means for adjusting the vertical height of said platform.

3. The apparatus set forth in claim 2 wherein said adjusting means includes actuating means responsive to the depositing of each successive strip on said receiving means to adjust the height of said platform a distance corresponding substantially to the thickness of said strip.

4. The apparatus set forth in claim 1 wherein said lifting means includes a pair of substantially parallel conveyors between which a strip of sod may be entrained.

5. The apparatus set forth in claim 4 including yieldable means yieldably urging said conveyors into sod gripping relationship with one another.

6. The apparatus set forth in claim 1 wherein said sod lifting means includes a pick-up member and means mounting said pick-up member at a level to engage and turn upwardly one end of a strip of sod.

7. The apparatus set forth in claim 6 including means for adjusting vertically the level of said pick-up member.

8. The apparatus set forth in claim 1 wherein said transfer means comprises a plurality of substantially parallel, coplanar, spaced apart fingers the corresponding ends of which are free.

9. The apparatus set forth in claim 8 wherein the opposite ends of said fingers are pivoted for conjoint tilting movement.

* * * * *